March 15, 1966  D. B. GARDNER  3,240,693
HYGROMETER
Filed Aug. 28, 1961

INVENTOR.
DOUGLAS B. GARDNER
BY *Robert M. Taylor, Jr.*
ATTORNEY

United States Patent Office 3,240,693
Patented Mar. 15, 1966

3,240,693
HYGROMETER
Douglas B. Gardner, La Puente, Calif., assignor to Beckman Instruments, Inc., a corporation of California
Filed Aug. 28, 1961, Ser. No. 134,506
6 Claims. (Cl. 204—195)

This invention relates to hygrometers and more particularly relates to an improved electrolytic hygrometer cell and a method of making the same.

The amount of water vapor present in a gas stream is of extreme importance in many processes utilized in the chemical and associated industries. It has therefore become necessary to determine continuously and with high accuracy the water content of process gas streams, as great damage can result if this content varies from its desirable percentage. For example, in the transportation of natural gas, a high moisture content causes formation of hydrates which freeze above 32° F., resulting in valve failures. Similarly, in the heat treating of metals, the presence of moisture in the feed gas will cause oxidation of the metal surface. In such processes the speed of response of the moisture measuring device is also of great importance, for obvious reasons.

A large number of devices have been proposed for the measurement of moisture in process gas streams, the majority being dependent on absorption or electrical conductivity for their operation. These are unsatisfactory for numerous reasons, in that those which are gravimetric in principle have an unduly long speed of response, while others, such as the electrical conductivity types, are very sensitive to the temperature of the surroundings, are influenced by inequalities and changes in film thickness and are inordinately affected by the presence of ionizable impurities which may occur in varying amounts in the fluids under examination. Another type of moisture-measuring device or hygrometer that has been proposed utilizes the known relationship between the amount of water absorbed by a hygroscopic substance and the amount of electrical current needed to electrolyze it. The latter type device was numerous advantages in that it is completely quantitative over wide ranges of moisture concentration and therefore eliminates the need for frequent calibration and standard samples, is quite selective to water, and is insensitive to temperature variations.

Various proposals have been made for producing such electrolytic hygrometer cells. In one proposal, a pair of conductors are wrapped around a suitably shaped core and coated with a hygroscopic substance. The core and wire structure is inserted in a tubular member and the gas to be tested is flowed through the annular space between the wires and the tubular member. Such a device is both difficult to produce and fragile in operation.

In another proposed cell, a pair of platinum conductors and a pair of copper wires are alternately wound on a mandrel, the copper wires serving as spacers for the platinum wires. A jacket of tetrafluoroethylene is then extruded on the mandrel-wire structures and the mandrel removed. The copper wires are then etched away by nitric acid, and a film of hygroscopic material is coated on the passageway left through the jacket. The gas to be tested is then flowed through this passageway. Although this cell is in some ways satisfactory, the wires are not securely held by the jacket with the result that maintaining equal spacing between the conductors is very difficult even to the point of frequent short circuiting during operation.

In an attempt to overcome this problem, a glass sheath has been used for firmly holding the wires. The sheath is applied by placing a glass tubing around the mandrel-coil structure, creating a pressure differential across the tubing and locally applying heat to the tubing. The heat and pressure differential causes the tubing to collapse onto the wires. Suitable glass is used so that a bond is formed between the sheath and the wires. While the wires are more firmly supported than before, the use of glass creates many durability problems, and the process used is fairly slow and difficult to perform.

According to the present invention, an electrolytic hygrometer cell is provided in which a pair of electrodes are firmly embedded in a suitable jacket around a passageway through the jacket which is coated with a thin film of a hygroscopic substance. The electrodes are almost completely surrounded by the jacket material so that they cannot be shaken loose. The exposed portions of the electrodes are flush with the passageway surface, permitting easy application of the hygroscopic film. This improved cell is obtained by space winding the electrodes onto a mandrel, thereby eliminating any need for etching. The resulting cell is low in first cost, is extremely durable, requires only negligible maintenance, and can be made in extremely small sizes. The cell also has an improved response time over any heretofore known. In addition, the process of making these cells is simple and inexpensive.

It is therefore a primary object of the present invention to provide an electrolytic hygrometer cell having firmly embedded electrodes and an extremely rapid speed of response.

It is also an object of the present invention to provide a process including a space winding step for making electrolytic hygrometer cells having firmly embedded electrodes.

These and further objects and advantages of the invention will become more apparent upon reference to the following specification and claims and appended drawnngs wherein:

Figure 1:
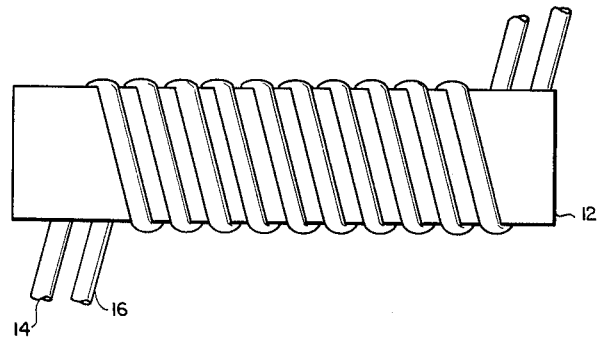
FIG. 1 is a view of a mandrel after having been space wound with a pair of electrical conductors.
Figure 2:
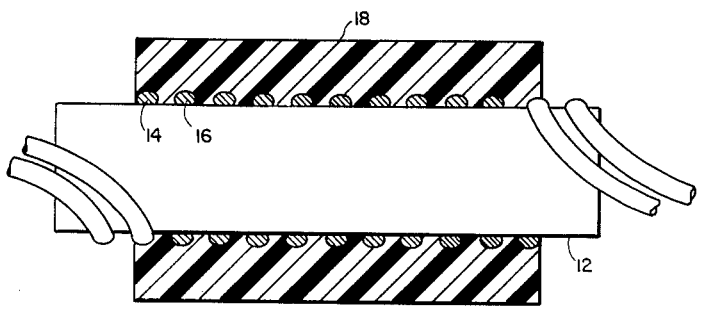
FIG. 2 is a view partly in section of the structure of FIG. 1 after a jacket of thermoplastic resin has been extruded thereon.
Figure 3:
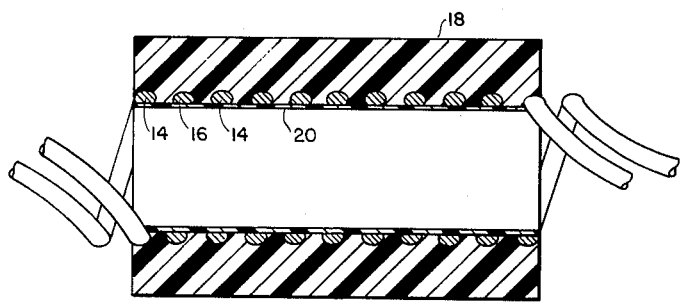
FIG. 3 is a view partly in section of the electrolytic hygrometer cell of the present invention.

Referring now to the several figures, FIG. 1 shows a mandrel 12, preferably of stainless steel, on which are wound two platinum wires 14 and 16 of equal diameter. These wires are space wound in a helix and in a bifilar manner so that each turn of the wire 14 is equally spaced from the adjoining turns of the wire 16. As these wires are wound, tension is carefully controlled at a point which results in a slight flattening of the wires against the mandrel 12. The winding can be performed at high speed and with high spacing precision. These wires serve as the electrodes through which current is passed to electrolyze moisture absorbed by a hygroscopic substance, as will be more fully explained hereinafter.

After the bifilar coil made up of wires 14 and 16 has been wound on the mandrel 12, the structure is passed through a die in a plastic extrusion machine which extrudes a suitable thermoplastic resin jacket around the wires. The mandrel may then be cut into desired lengths and the jacket stripped off the opposite ends of the coil-mandrel system. The wires are then unwrapped from the mandrel down to the respective ends of the jacket for later connection into any suitable hygrometer circuit. The resin used must have an extremely low water absorption characteristic, must be electrically insulating and must be unaffected by any components of gases which may be tested by the cell.

The resin must have a low water absorption characteristic, because any water absorbed by the jacket will either not be electrolyzed when current is passed through the electrodes and result in error or will give up this water to the hygroscopic substance very slowly and thus lengthen the response time of the cell.

The resin must be an insulator or the leakage current between the two electrodes will cause the hygrometer to give a higher reading than is correct. The material must be non-corrodible in order to insure long life for the cell. It has been found the polychlorotrifluoroethylene is ideal for the purposes of this invention and the use of this material is preferred. Other materials, such as polytetrafluoroethylene are also suitable for use in this invention.

The space winding of the wires and the subsequent extruding of the thermoplastic resin jacket results in a cell that is much sturdier and more durable than any heretofore known. Since no copper spacing wires are required when the platinum wires are space wound, the extruded resin is free to flow into the interstices between the wires. As can be seen from the several figures, the wires are almost completely surrounded by the resin, only the portion previously flattened against the mandrel remaining free of the resin. The wires thus cannot be jarred loose unless the entire cell is destroyed. The elimination of copper spacing wires also eliminates any need for etching and thus considerably speeds up the production of the cells. In addition, the exposure of only a minor portion of the electrodes will result in an improved time of response, as will be more fully explained hereinafter.

After the extrusion, the stainless steel mandrel is removed from the element by stretching it past the yield point which causes a reduction in the cross-sectional area of the mandrel, allowing its simple removal from the cell. Of course, any other suitable method of removing the mandrel may be used, particularly if the mandrel is made of material other than stainless steel. After the mandrel is removed, a coating 20 of a hygroscopic substance, preferably phosphorous pentoxide, is applied uniformly to the surface of the annular passageway left through the jacket 18. This may be done by passing a slurry of phosphoric acid through the passageway and electrolyzing it to phosphorous pentoxide by passing an electrolyzing current through the electrodes with the result that a bridge is formed between each adjacent turn of the coil.

Figure 4:
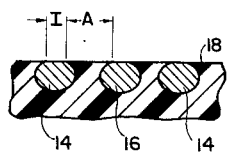
FIG. 4 is an enlarged sectional view of a portion of the structure shown in FIG. 2 after the mandrel has been removed.

FIG. 4 shows, in a magnified fashion, the condition of the surface of the annular passageway through the jacket 18 before it is coated with the hygroscopic substance. As can be seen from this figure, the portions of the wires 14 and 16 that were originally flattened against the mandrel 12 lie flush with the portions of the jacket that filled in the spaces between the wires during the extruding. This construction gives rise to a greater speed of response than has heretofore been possible.

The hygroscopic coating which is applied uniformly to the cell is effective in regions only where an electric field exists; that is, in the space between the platinum wires. It is only in this region that electrolysis of water occurs. The portion of the hygroscopic coating which is adhering directly to a wire has no electric field applied, therefore no electrolysis occurs in this region. Moisture which is absorbed by the coating on the wire must migrate into the region between the wires where the field exists before it can be electrolyzed. The fraction of total cell surface area consisting of the wire element is thus inactive and acts as a capacitor or sponge, storing moisture and allowing only electrolysis by migration. Area which is between the wire elements is active and contributes to the function of the cell. The ratio of active to inactive area is thus one factor which influences the speed of response of the cell to changing signal conditions. As can be seen in FIG. 4, the ratio of active (A) to inactive (I) areas in the present cell is quite high and thus the response is considerably faster than any previously known cell in which the wire elements protruded into the passageway. In addition, as stated above, this construction gives the cell a greater durability to shock and mechanical abuse because the windings are throughly embedded in the thermoplastic jacket.

It will be apparent from the foregoing that the present invention provides a simple and inexpensive process of making an electrolytic hygrometer cell in which a pair of wires are space wound on a mandrel and the spaces between the wires filled with a thermoplastic resin. The cell of the invention is sturdy, accurate and has a speedy response time to a change in signal condition.

The invention may be embodied in other specific forms not departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A process of making an electrolytic hygrometer cell comprising the steps of:

space winding a single pair of electrical conductors on a mandrel so that said conductors are substantially equally spaced from each other while exerting sufficient tension on said conductors to cause them to partially flatten against said mandrel;

disposing a jacket of a thermoplastic resin around said winding and said mandrel;

applying pressure to the external surface of said jacket to substantially completely fill the space between said conductors with said resin;

removing said mandrel from said jacket whereby an annular passageway is formed in said jacket; and coating a thin film of a hygroscopic substance on the surface of said annular passageway over the entire length of said winding.

2. A process of making an electrolytic hygrometer cell comprising the steps of:

space winding a single pair of electrical conductors on a mandrel while exerting sufficient tension on said conductors to cause them to partially flatten against said mandrel;

extruding a jacket of a thermoplastic resin around said conductors on said mandrel so that said resin completely encompasses said conductors except for said flattened portions;

removing said mandrel from said jacket whereby an annular passageway is formed in said jacket, a portion of the surface of said passageway being made up of the flattened portions of said conductors; and coating a thin film of a hygroscopic substance on the surface of said passageway.

3. A process of making an electrolytic hygrometer cell comprising the steps of:

space winding a single pair of platinum wires on a mandrel so that said wires are substantially equally spaced from each other while exerting a sufficient tension on said wires to cause them to partially flatten against said mandrel;

extruding a jacket of a thermoplastic resin over said mandrel and around said wires so that said resin completely encompasses said wires except for the portions flattened against said mandrel;

removing said mandrel from said jacket whereby an annular passageway is formed in said jacket, a portion of the surface of said passageway being made up of the flattened portions of said conductors; and coating a thin film of phosphorous pentoxide on the surface of said passageway.

4. The process of claim 3 wherein said mandrel is removed by stretching it past its yield point whereby its cross-sectional area is reduced.

5. The process of claim 3 wherein said resin is polychlorotrifluoroethylene.

6. An electrolytic hygrometer cell comprising:

a bifilar helical coil providing a pair of electrodes, each turn of said coil having a flat inner surface;

a thermoplastic resin jacket forming a support for said coil, said jacket surrounding said coil and being substantially coaxial with said coil and having portions extending between the turns of said coil, said portions completely filling the space between the turns and having flat inner surfaces flush with the flat inner surfaces of said turns of said coil whereby a smooth annular passageway is formed through said coil and said jacket; and a film of hygroscopic material covering the surface of said passageway and forming a bridge between each adjacent inner surface of said turns of said coil.

References Cited by the Examiner

UNITED STATES PATENTS

| | | | |
|---|---|---|---|
| 2,830,945 | 4/1958 | Keidel | 204—195 |
| 2,834,693 | 4/1960 | Reinecke et al. | 204—195 |
| 2,993,853 | 7/1961 | Berry | 204—195 |
| 3,051,631 | 8/1962 | Harbin et al. | 204—195 |

OTHER REFERENCES

Keidel: "Analytical Chemistry," vol. 31, No. 12 December 1959, pp. 2043–2048.

JOHN H. MACK, *Primary Examiner.*

JOHN R. SPECK, MURRAY TILLMAN, WINSTON A. DOUGLAS, *Examiners.*